(12) United States Patent
Verseman

(10) Patent No.: US 12,546,244 B1
(45) Date of Patent: Feb. 10, 2026

(54) EXHAUST TREATMENT DEVICES FOR EXHAUST AFTERTREATMENT SYSTEM

(71) Applicant: Cummins Emission Solutions Inc., Columbus, IN (US)

(72) Inventor: Corey Verseman, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/973,284

(22) Filed: Dec. 9, 2024

(51) Int. Cl.
| | |
|---|---|
| *F01N 3/28* | (2006.01) |
| *F01N 3/021* | (2006.01) |
| *F01N 3/035* | (2006.01) |
| *F01N 3/20* | (2006.01) |
| *F01N 13/00* | (2010.01) |
| *F01N 13/08* | (2010.01) |
| *F01N 13/18* | (2010.01) |

(52) U.S. Cl.
CPC .......... *F01N 3/2882* (2013.01); *F01N 3/021* (2013.01); *F01N 3/035* (2013.01); *F01N 3/2066* (2013.01); *F01N 13/009* (2014.06); *F01N 3/2839* (2013.01); *F01N 13/08* (2013.01); *F01N 13/1816* (2013.01); *F01N 13/1838* (2013.01); *F01N 2450/18* (2013.01); *F16B 2200/509* (2018.08)

(58) Field of Classification Search
CPC combination set(s) only.
See application file for complete search history.

(56) References Cited

U.S. PATENT DOCUMENTS

| | | | |
|---|---|---|---|
| 8,757,133 B2 | 6/2014 | Czapka et al. | |
| 2005/0253387 A1* | 11/2005 | Fritz | F01N 13/1827 285/365 |
| 2006/0053779 A1* | 3/2006 | Belisle | F16L 23/08 60/299 |
| 2011/0120085 A1* | 5/2011 | Saito | F01N 13/1855 60/272 |
| 2013/0156652 A1* | 6/2013 | Kamei | F01N 3/0222 422/170 |
| 2013/0333363 A1 | 12/2013 | Joshi et al. | |
| 2014/0116796 A1* | 5/2014 | Poulin | F01N 13/08 60/281 |
| 2016/0053663 A1* | 2/2016 | Davison | F01N 13/009 60/301 |
| 2018/0245493 A1* | 8/2018 | Kimball | F01N 3/046 |
| 2019/0285210 A1* | 9/2019 | Takahara | F16L 23/08 |

(Continued)

Primary Examiner — Binh Q Tran
(74) Attorney, Agent, or Firm — Jay J. Hoette; Carroll, Hoette & Butscher, LLC

(57) ABSTRACT

An exhaust treatment device for an exhaust aftertreatment system includes a housing having a chamber for receiving exhaust gas. The housing extends between a first end and a second end and includes a first exhaust tube at the first end and a second exhaust tube at the second end. The exhaust treatment device includes a tubing fitting for the first exhaust tube at the first end having a fitting body and an annular flange at an exterior of the fitting body. The annular flange has a flange interface configured to face a mating flange of a mating tubing fitting. The tubing fitting includes a mounting bracket that extends from the fitting body configured to be attached to a bracket support. The exhaust treatment device includes a band clamp configured to be coupled to the annular flange to securely couple the annular flange to the mating flange.

20 Claims, 9 Drawing Sheets

(56) References Cited

U.S. PATENT DOCUMENTS

2020/0347762 A1* 11/2020 Motoyama .......... F01N 13/1827
2023/0143888 A1     5/2023  Liu et al.
2023/0151755 A1     5/2023  Johnson et al.

* cited by examiner

EXHAUST TREATMENT DEVICES FOR EXHAUST AFTERTREATMENT SYSTEM

BACKGROUND OF THE INVENTION

The subject matter herein relates generally to exhaust aftertreatment systems for vehicles.

Exhaust aftertreatment systems receive and treat exhaust gas generated from an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides (NOx) present in the exhaust gas.

The exhaust treatment devices are typically mounted in the vehicle, such as to the frame or other components of the vehicle, using mounting brackets and hangers, which may be welded or otherwise fixed within the vehicle. The mounting components add weight to the overall system, which may compromise structural durability of the mounting components over time. Additionally, assembly clearances and tolerances for the components may be small. Serviceability of the exhaust treatment devices may be difficult and time consuming, depending on the types of mounting features used and the mounting locations within the vehicle. Additionally, exhaust leakage at the joints and interfaces between the various components may be problematic.

BRIEF DESCRIPTION OF THE INVENTION

In one embodiment, an exhaust treatment device for an exhaust aftertreatment system is provided and includes a housing that has a chamber for receiving exhaust gas. The housing extends between a first end and a second end. The housing has a first exhaust tube at the first end and a second exhaust tube at the second end. The exhaust treatment device includes a tubing fitting for the first exhaust tube at the first end. The tubing fitting has a fitting body. The tubing fitting includes an annular flange at an exterior of the fitting body. The annular flange has a flange interface configured to face a mating flange of a mating tubing fitting. The tubing fitting includes a mounting bracket that extends from the fitting body configured to be attached to a bracket support. The exhaust treatment device includes a band clamp configured to be coupled to the annular flange to securely couple the annular flange to the mating flange.

In another embodiment, an exhaust aftertreatment system is provided and includes a first exhaust treatment device that has a first housing has a first chamber for receiving exhaust gas. The first housing has a first exhaust tube and a first tubing fitting for the first exhaust tube. The first tubing fitting has a first fitting body and a first annular flange at an exterior of the first fitting body. The first annular flange has a first flange interface. The first tubing fitting includes a mounting bracket that extends from the first fitting body configured to be attached to a bracket support. The exhaust treatment device includes a second exhaust treatment device that has a second housing has a second chamber for receiving the exhaust gas. The second housing has a second exhaust tube and a second tubing fitting for the second exhaust tube. The second tubing fitting has a second fitting body and a second annular flange at an exterior of the second fitting body. The second annular flange has a second flange interface configured to face the first flange interface. The exhaust treatment device includes a band clamp configured to be coupled to the first annular flange and the second annular flange to securely couple the first tubing fitting to the second tubing fitting.

In a further embodiment, an exhaust aftertreatment system is provided and includes a diesel oxidation catalyst (DOC) device that has a DOC housing has a DOC chamber for receiving exhaust gas. The DOC housing has a DOC exhaust tube that has a DOC tubing fitting has a DOC fitting body and a DOC annular flange at an exterior of the DOC fitting body. The DOC tubing fitting includes a DOC mounting bracket that extends from the DOC fitting body configured to be attached to a DOC bracket support. The exhaust aftertreatment system a diesel particular filter (DPF) device has a DPF housing has a DPF chamber for receiving exhaust gas. The DPF housing has a DPF exhaust tube has a DPF tubing fitting has a DPF fitting body and a DPF annular flange at an exterior of the DPF fitting body. The DPF tubing fitting includes a DPF mounting bracket that extends from the DPF fitting body configured to be attached to a DPF bracket support. The exhaust treatment device includes The exhaust aftertreatment system a selective catalytic reduction (SCR) device has a SCR housing has a SCR chamber for receiving exhaust gas. The SCR housing has a SCR exhaust tube has a SCR tubing fitting has a SCR fitting body and a SCR annular flange at an exterior of the SCR fitting body. The SCR tubing fitting includes a SCR mounting bracket extends from the SCR fitting body configured to be attached to a SCR bracket support. The exhaust aftertreatment system band clamps configured to be coupled to the DOC annular flange. The DPF annular flange, and the SCR annular flange.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

Described herein are various embodiments of exhaust treatment devices for an exhaust aftertreatment system. The exhaust treatment device includes a housing having a chamber for receiving exhaust gas with a first exhaust tube at a first end and a second exhaust tube at a second end. A tubing fitting is provided at the first exhaust tube. The tubing fitting has a fitting body, an annular flange at an exterior of the fitting body having a flange interface configured to face a mating flange of a mating tubing fitting, and a mounting bracket extending from the fitting body configured to be attached to a bracket support. A band clamp is used to couple the annular flange to the mating flange to secure the tubing fitting to the mating tubing fitting. The exhaust treatment devices may include a diesel oxidation catalyst (DOC) device and/or a diesel particular filter (DPF) device and/or a selective catalytic reduction (SCR) device and/or other exhaust processing devices. In various embodiments, the exhaust treatment devices include exhaust tubes routed between other exhaust treatment devices. The exhaust treatment devices include an exhaust inlet at one end and an exhaust outlet at the other end. The tubing fitting and the band clamp may be provided at the exhaust inlet and/or the exhaust outlet of any or all of the exhaust treatment devices.

Figure 1:
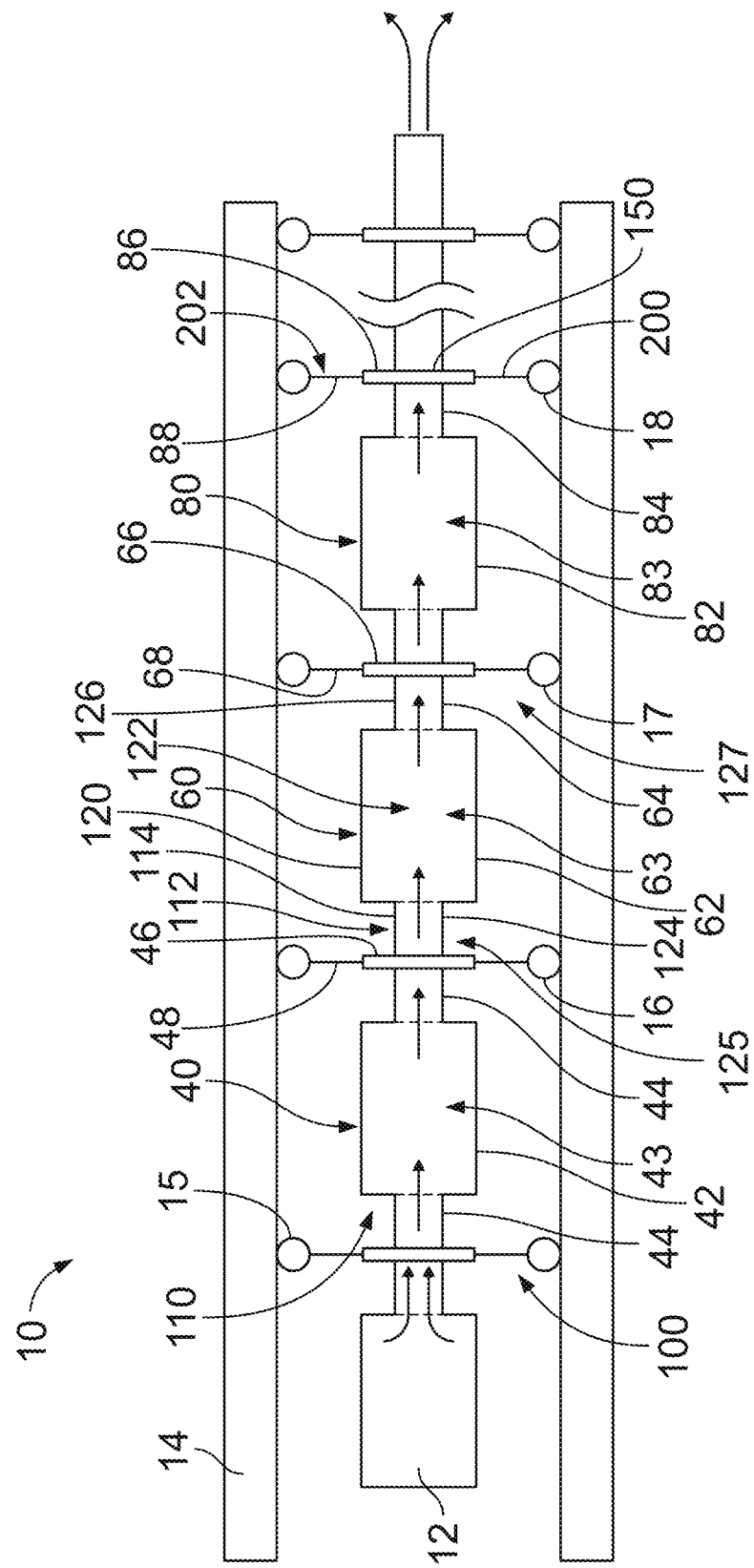
FIG. 1 is a schematic view of an exhaust aftertreatment system for a vehicle in accordance with an exemplary embodiment.

FIG. 1 is a schematic view of an exhaust aftertreatment system 100 for a vehicle 10 in accordance with an exemplary embodiment. The exhaust aftertreatment system 100 is coupled to an internal combustion engine 12. The exhaust aftertreatment system 100 is capable of receiving and treating exhaust gas generated by the engine 12. After being treated by the exhaust aftertreatment system 100, exhaust gas is expelled into the atmosphere via a tailpipe as indicated by the arrows. In certain implementations, the exhaust aftertreatment system 100 is secured to the vehicle 10 in which the engine 12 is housed, such as to a frame 14 of the vehicle 10.

The exhaust aftertreatment system 100 includes a plurality of exhaust treatment devices 110. The exhaust treatment devices 110 may be directly connected to each other, such as at separable mating joints 112, or may be indirectly connected to each other by exhaust tubes 114. In various embodiments, multiple exhaust treatment devices 110 may be combined into a common housing.

In an exemplary embodiment, each exhaust treatment device 110 includes a housing 120 having a chamber 122 for receiving exhaust gas with a first exhaust tube 124 at a first end 125 and a second exhaust tube 126 at a second end 127. A tubing fitting 200 is provided at the first exhaust tube 124 and/or the second exhaust tube 126. In an exemplary embodiment, the tubing fitting 200 includes a mounting bracket 202 configured to be attached to a bracket support 15 of the frame 14. In an exemplary embodiment, a band clamp 150 is used to couple the tubing fitting 200 to the tubing fitting 200 of another exhaust treatment device 110. The band clamp 150 forms a separable mating joint. In an exemplary embodiment, the band clamp 150 may be a V-band clamp. For example, the band clamp 150 may be a Marmon joint.

In an exemplary embodiment, the exhaust aftertreatment system 100 includes a diesel oxidation catalyst (DOC) device 40, a diesel particular filter (DPF) device 60, and a selective catalytic reduction (SCR) device 80. The DPF device 60 is downstream of the DOC device 40. The SCR device 80 is downstream of the DPF device 60. In other embodiments, the exhaust aftertreatment system 100 can have fewer or more than the number of exhaust treatment devices 110 shown in FIG. 1 in a different order relative to each other without departing from the essence of the present disclosure.

In an exemplary embodiment, the DOC device 40 includes a DOC housing 42 having a DOC chamber 43 for receiving the exhaust gas. The DOC housing 42 includes a DOC exhaust tube 44 having a DOC tubing fitting 46 having a DOC fitting body and a DOC annular flange at an exterior of the DOC fitting body. The DOC tubing fitting 46 includes a DOC mounting bracket 48 extending from the DOC fitting body configured to be attached to a DOC bracket support 16.

In an exemplary embodiment, the DPF device 60 includes a DPF housing 62 having a DPF chamber 63 for receiving the exhaust gas. The DPF housing 62 includes a DPF exhaust tube 64 having a DPF tubing fitting 66 having a DPF fitting body and a DPF annular flange at an exterior of the DPF fitting body. The DPF tubing fitting 66 includes a DPF mounting bracket 68 extending from the DPF fitting body configured to be attached to a DPF bracket support 17.

In an exemplary embodiment, the SCR device 80 includes a SCR housing 82 having a SCR chamber 83 for receiving the exhaust gas. The SCR housing 82 includes a SCR exhaust tube 84 having a SCR tubing fitting 86 having a SCR fitting body and a SCR annular flange at an exterior of the SCR fitting body. The SCR tubing fitting 86 includes a SCR mounting bracket 88 extending from the SCR fitting body configured to be attached to a SCR bracket support 18.

The band clamps 150 are configured to be coupled to the DOC tubing fitting 46, the DPF tubing fitting 66, and the SCR tubing fitting 86, such as to connect the exhaust treatment devices 110 to each other and/or to exhaust tubes 114. The band clamps 150 may be coupled to the exhaust inlets and/or the exhaust outlets of the exhaust treatment devices 110.

Figure 2:
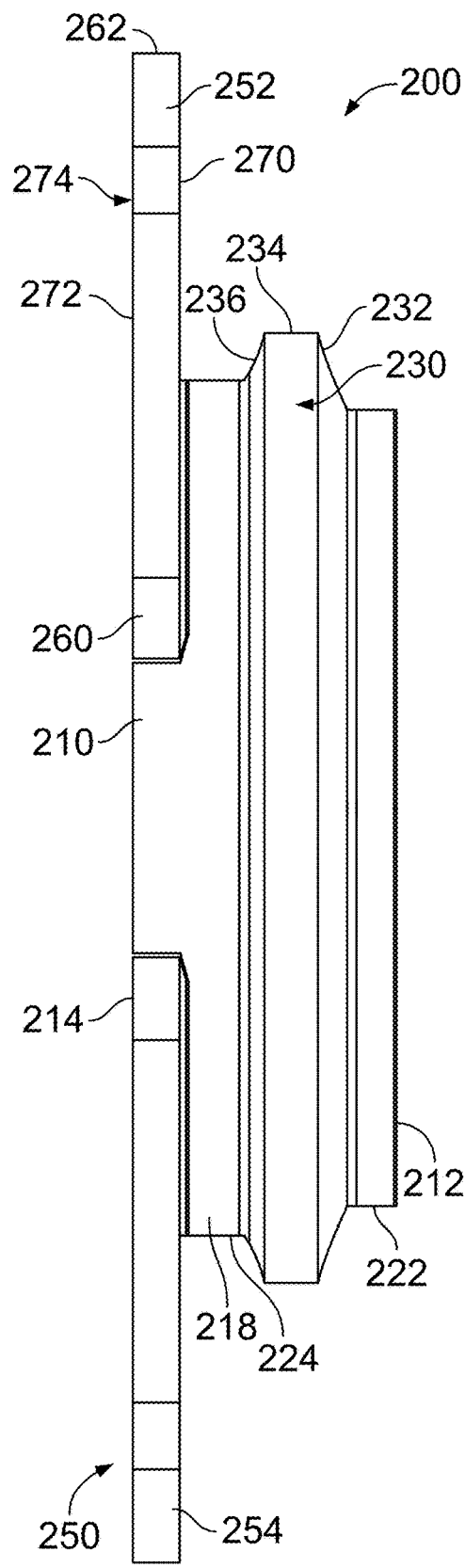
FIG. 2 is a side view of the tubing fitting for an exhaust treatment device in accordance with an exemplary embodiment.
Figure 3:
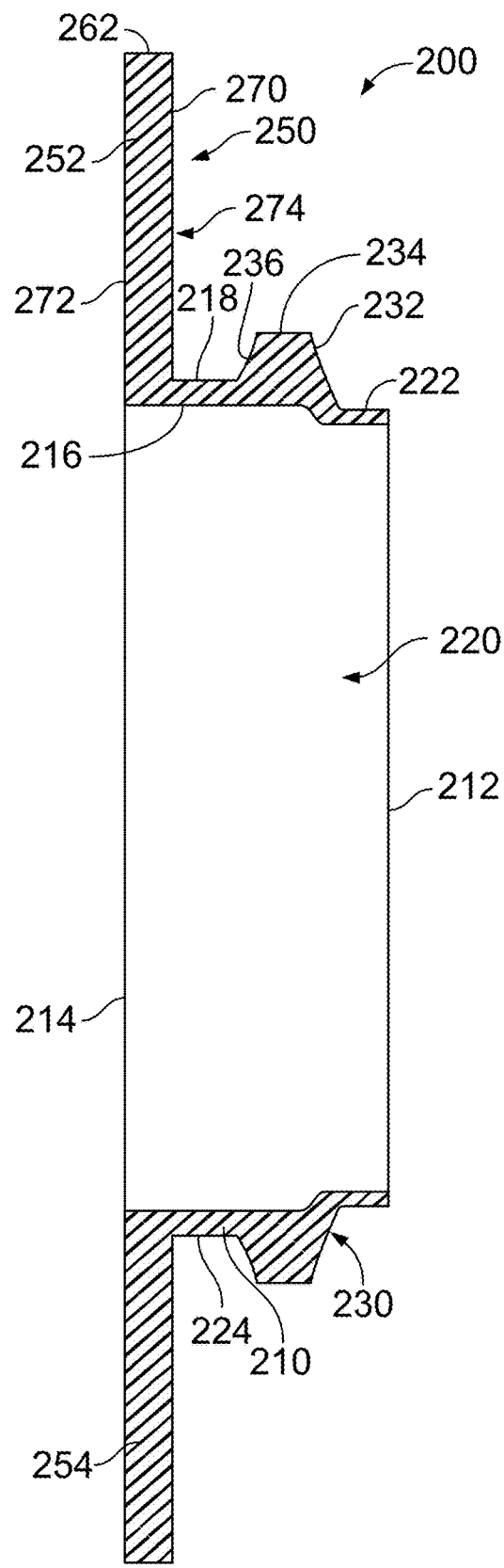
FIG. 3 is a cross-sectional view of the tubing fitting in accordance with an exemplary embodiment.
Figure 4:
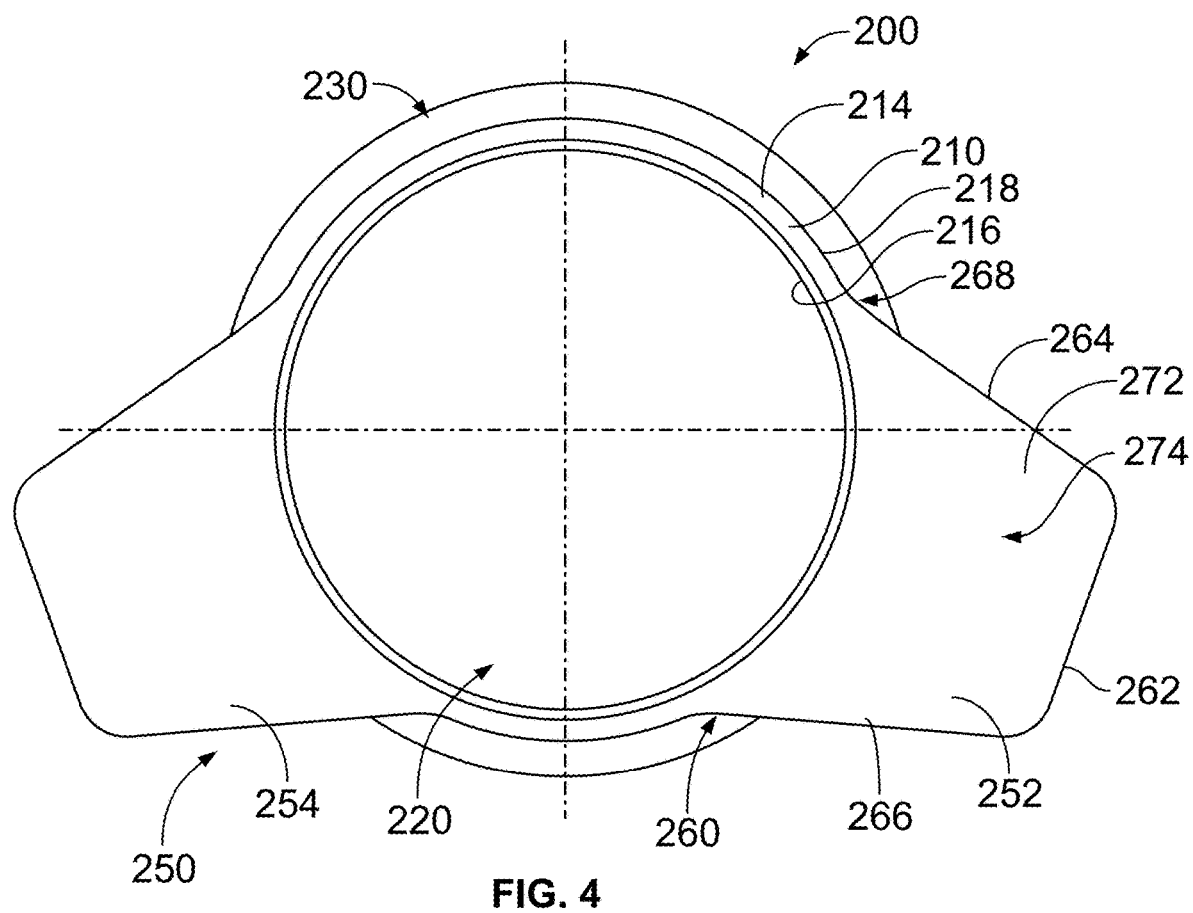
FIG. 4 is an end view of the tubing fitting in accordance with an exemplary embodiment.

FIG. 2 is a side view of the tubing fitting 200 for an exhaust treatment device 110 in accordance with an exemplary embodiment. FIG. 3 is a cross-sectional view of the tubing fitting 200 in accordance with an exemplary embodiment. FIG. 4 is an end view of the tubing fitting 200 in accordance with an exemplary embodiment.

The tubing fitting 200 is used to form a joint with the mating exhaust treatment device 110 (for example the upstream or downstream device/exhaust tube). For example, the tubing fitting 200 is configured to be secured to the mating exhaust treatment device 110 using the band clamp 150 (shown in FIG. 1). In an exemplary embodiment, the tubing fitting 200 forms part of a Marmon joint. In an exemplary embodiment, the tubing fitting 200 is used to mount or secure the exhaust treatment device 110 within the vehicle 10, such as to the bracket support 15 (shown in FIG. 1). For example, the tubing fitting may be welded to support rods (not shown) between the tubing fitting 200 and the bracket support 15.

In an exemplary embodiment, the tubing fitting 200 includes a fitting body 210, an annular flange 230 at an exterior of the fitting body 210, and a mounting bracket 250 extending from the fitting body 210. The annular flange 230 is configured to be coupled to the band clamp 150 to secure the tubing fitting 200 to the mating exhaust treatment device 110. The mounting bracket 250 is configured to be secured to the bracket support 15, such as being welded to support rods between the bracket support 15 and the mounting bracket 250.

In an exemplary embodiment, the fitting body 210 is configured to be coupled to the housing 120 of the exhaust treatment device 110. For example, the fitting body 210 may be welded to an end of the housing 120. In alternative embodiments, the fitting body 210 may be integral with the housing 120, such as being a unitary, monolithic structure formed by a common forming process. In an exemplary embodiment, the fitting body 210 is manufactured from a metal material, such as an aluminum material. In various embodiments, the fitting body 210 is die-cast. Alternatively, the fitting body 210 may be manufactured by other processes, such as being machined, stamped and formed, and the like.

The fitting body 210 extends between a front 212 and a rear 214. In an exemplary embodiment, the fitting body 210 is annular, such as being generally ring-shaped. For example, the fitting body 210 surrounds a channel 220 passing through the fitting body 210 between the front 212 and the rear 214. The channel 220 may be cylindrical or have cylindrical segments along the central longitudinal axis of the fitting body 210. The channel 220 may be stepped along the axis, such as including a larger diameter at the rear 214 and a smaller diameter at the front 212, or vice versa. In other various embodiments, the channel 220 may extend along a non-linear axis. The fitting body 210 includes an interior surface 216 defining the channel 220. The fitting body 210 has an exterior surface 218 opposite the interior surface 216. The fitting body 210 has a thickness between the interior and exterior surfaces 216, 218. The thickness may be variable along the length of the fitting body 210. The annular flange 230 extends from the exterior surface 218, such as proximate to the front 212. The mounting bracket 250 extends from the exterior surface 218, such as proximate to the rear 214.

The annular flange 230 extends circumferentially around the exterior surface 218 of the fitting body 210. In the illustrated embodiment, the annular flange 230 is located proximate to the front 212. Optionally, a forward section 222 of the fitting body 210 is located forward of the annular flange 230. The forward section 222 provides a mating surface for mating to the mating exhaust treatment device 110. A rearward section 224 of the fitting body 210 is located rearward of the annular flange 230. The mounting bracket 250 extends from the rearward section 224. In the illustrated embodiment, the annular flange 230 may be approximately centered between the front 212 and the rear 214. In other embodiments, the annular flange 230 is located at the front 212 (for example, no forward section 22 forward of the annular flange 230).

The annular flange 230 includes a forward surface 232, a rearward surface 236 and an outer end 234 between the forward and rearward surfaces 232, 236. The outer end 234 may be a flat surface. Alternatively, the outer end 234 may be a tip or peak. In an exemplary embodiment, the forward surface 232 is angled or slanted. For example, the forward surface 232 may be non-parallel to the rearward surface 236. The forward surface 232 may be non-perpendicular to the outer end 234. In an exemplary embodiment, the rearward surface 236 is angled or slanted. For example, the rearward surface 236 may be non-parallel to the forward surface 232. The rearward surface 236 may be non-perpendicular to the outer end 234. In an exemplary embodiment, the annular flange 230 is trapezoidal shaped. For example, the annular flange 230 may be wider at the base and narrower at the outer end 234. In an exemplary embodiment, the forward surface 232 may be longer than the rearward surface 236. For example, the forward section 222 may be further from the outer end 234 than the rearward section 224.

The mounting bracket 250 extends from the exterior surface 218. The mounting bracket 250 is configured to be secured to the bracket support 15, such as being welded to support rods between the bracket support 15 and the mounting bracket 250. The mounting bracket 250 extends from the fitting body 210 remote from the annular flange 230. For example, the mounting bracket 250 extends from the rearward section 224 rearward of the annular flange 230. In the illustrated embodiment, the mounting bracket 250 is located at the rear 214. However, a portion of the fitting body 210 may extend rearward of the mounting bracket 250.

In an exemplary embodiment, the mounting bracket 250 includes a first bracket tab 252 and a second bracket tab 254 annually spaced from the first bracket tab 252. Greater or fewer bracket tabs may be provided in alternative embodiments, such as a single bracket tab or a third bracket tab positioned between the first and second bracket tabs 252, 254. The first and second bracket tabs 252, 254 may be located on opposite sides of the fitting body 210 (for example, right side/left side or top/bottom). In an exemplary embodiment, the mounting bracket 250 is asymmetrical. For example, the first and second bracket tabs 252, 254 may be offset or non-axially aligned. For example, the first and second bracket tabs 252, 254 are spaced apart by an obtuse angle between 90° and 180°.

Each bracket tab 252, 254 includes a base 260 at the fitting body 210, an outer edge 262 opposite the base 260, a first edge 264, and a second edge 266 opposite the first edge 264. The first and second edges 264, 266 extend between the base 260 and the outer edge 262. The outer edge 262 may be a flat surface. Alternatively, the outer edge 262 may be a tip or peak. In an exemplary embodiment, the bracket tabs 252, 254 of the mounting bracket 250 extend from the fitting body 210 at a radiused transitions 268. For example, the radiused transitions are provided at the base 260.

In an exemplary embodiment, the first edge 264 is angled or tapered. For example, the first edge 264 may be non-parallel to the second edge 266. The first edge 264 may be non-perpendicular to the outer edge 262. In an exemplary embodiment, the second edge 266 is angled or tapered. For example, the second edge 266 may be non-parallel to the first edge 264. The second edge 266 may be non-perpendicular to the outer edge 262. In an exemplary embodiment, the bracket tab 252, 254 is trapezoidal shaped. For example, the bracket tab 252, 254 may be wider at the base 260 and narrower at the outer edge 262. In the illustrated embodiment, the first and second bracket tabs 252, 254 may have the same size and shape. Alternatively, the first and second bracket tabs 252, 254 may have different sizes and/or shapes. The first and second bracket tabs 252, 254 may have other shapes in alternative embodiments.

Each bracket tab 252, 254 includes a front surface 270 and a rear surface 272. In an exemplary embodiment, the front surface 270 and/or the rear surface 272 includes a weld pad 274 configured to be welded to a support component, such as a support rod extending between the mounting bracket 250 and the bracket support 15. The weld pad 274 may be planar.

Figure 5:
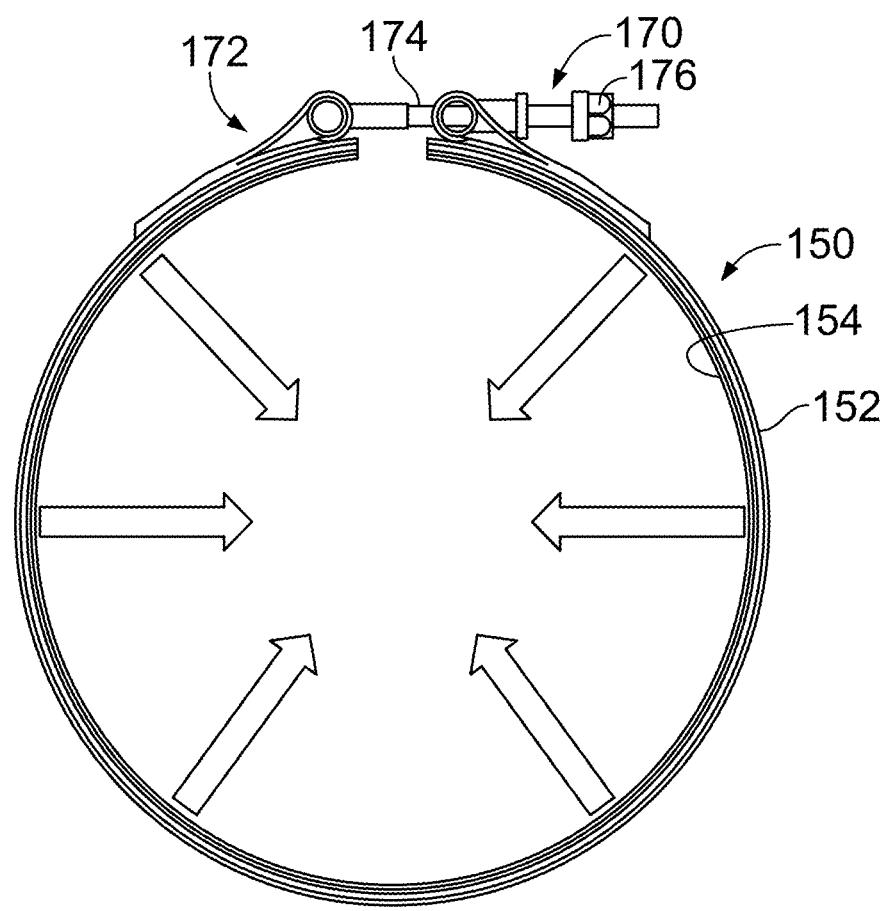
FIG. 5 is a side view of the band clamp in accordance with an exemplary embodiment.
Figure 6:
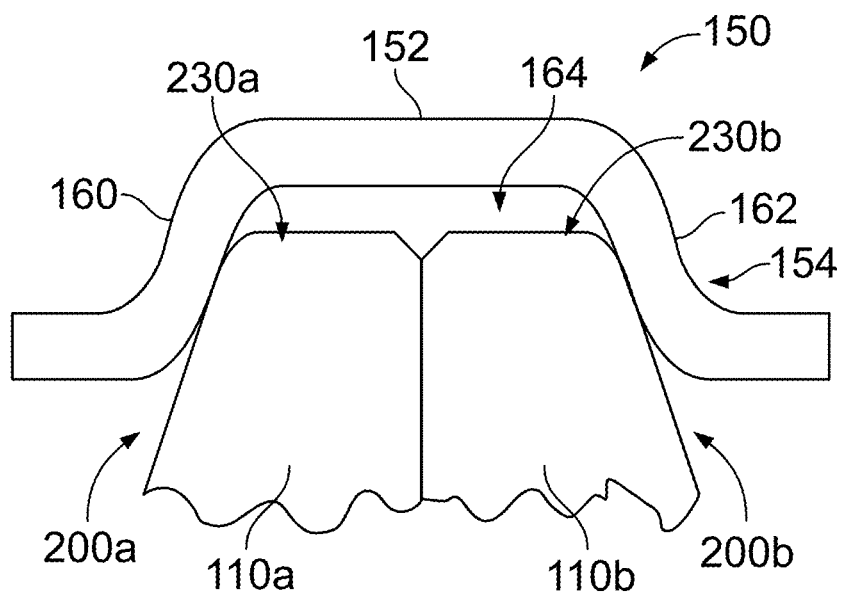
FIG. 6 is a cross-sectional view of a portion of the band clamp in accordance with an exemplary embodiment.

FIG. 5 is a side view of the band clamp 150 in accordance with an exemplary embodiment. FIG. 6 is a cross-sectional view of a portion of the band clamp 150 in accordance with an exemplary embodiment. The band clamp 150 is used to couple together two adjoining exhaust treatment devices 110a, 110b to form a separable interface between the exhaust treatment devices 110a, 110b. The band clamp 150 forms a secure joint between the exhaust treatment devices 110a, 110b. The band clamp 150 holds the exhaust treatment devices 110a, 110b tightly together to prevent exhaust leakage between the exhaust treatment devices 110a, 110b. Optionally, one or more gaskets (not shown) may be provided at the interface between the exhaust treatment devices 110a, 110b. In an exemplary embodiment, the band clamp 150 is a V-band clamp.

The band clamp 150 includes an outer band 152 and a retainer 154 interior of the outer band 152. The band clamp 150 includes a coupler 170 used to secure and tighten the band clamp 150. In an exemplary embodiment, the coupler 170 includes a trunnion 172 connecting the coupler 170 to the outer band 152 and a T-bolt extending from the trunnion. A nut 176 is threadably coupled to a threaded end of the bolt 174 to tighten the coupler 170. Other types of coupling mechanisms may be used in alternative embodiments to tighten the outer band 152.

The retainer 154 includes side walls 160, 162 forming an inner groove 164. In an exemplary embodiment, the side walls 160, 162 are angled relative to each other to form a wedge-shaped inner groove 164. Optionally, the inner groove 164 may be V-shaped. The inner groove 164 is configured to receive the tubing fittings of the joining exhaust treatment devices. The side walls 160, 162 are configured to provide compression between the portions of the tubing fittings 200a, 200b (for example, the annular flanges 230a, 230b) as the band clamp 150 is tightened to securely couple the tubing fittings 200a, 200b together. For example, when the outer band 152 is tightened, the retainer 154 is compressed radially inward, driving the side walls 160, 162 inward toward the annular flanges 230a, 230b causing a wedging action, thus compressing the tubing fittings 200a, 200b together in the inner groove 164.

Figure 7:
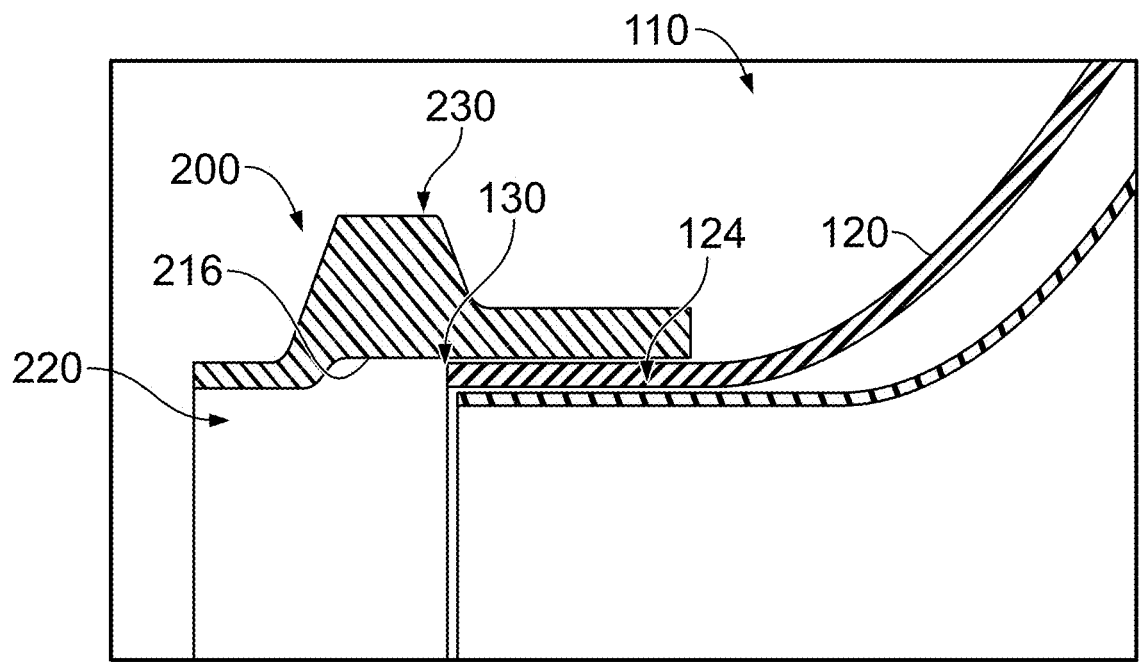
FIG. 7 is a cross-sectional view of a portion of the exhaust treatment device in accordance with an exemplary embodiment.

FIG. 7 is a cross-sectional view of a portion of the exhaust treatment device 110 in accordance with an exemplary embodiment. FIG. 7 shows the tubing fitting 200 extending from the exhaust tube 124 of the housing 120. The tubing fitting 200 provides an interface for coupling the exhaust treatment device 110 to a mating exhaust treatment device, such as another exhaust processing device or an exhaust tube.

In an exemplary embodiment, the tubing fitting 200 is separate and discrete from the exhaust tube 124 and welded to the exhaust tube 124 at a weld joint 130. For example, the exhaust tube 124 may be received in the channel 220 of the fitting body 210. The weld joint 130 is provided at the interior surface 216 of the fitting body 210. The tubing fitting 200 surrounds the end of the exhaust tube 124 and extends forward of the exhaust tube 124.

In alternative embodiments, the tubing fitting 200 may be integral with the housing 120. For example, the components of the tubing fitting 200, such as the annular flange 230 and the mounting bracket 250, may be formed integral with the housing 120.

Figure 8:
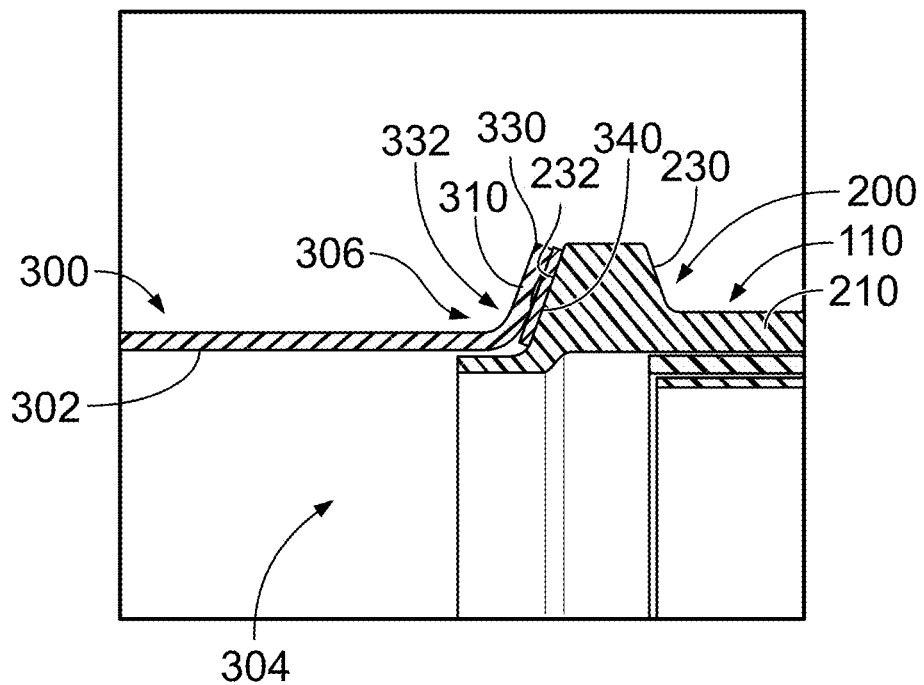
FIG. 8 is a cross-sectional view of a portion of the exhaust treatment device showing the exhaust treatment device coupled to a mating exhaust treatment device in accordance with an exemplary embodiment.

FIG. 8 is a cross-sectional view of a portion of the exhaust treatment device 110 showing the exhaust treatment device 110 coupled to a mating exhaust treatment device 300. The mating exhaust treatment device 300 may be an exhaust processing device, such as the DOC device 40, the DPF device 60, the SCR device 80, or other exhaust processing device. In other embodiments, the mating exhaust treatment device 300 may be an exhaust tube, such as a metal pipe configured to extend between the exhaust treatment device 110 and another exhaust processing device.

The mating exhaust treatment device 300 includes a housing 302 having an exhaust tube 304 at the end of the housing 302. The mating exhaust treatment device 300 includes a tubing fitting 306 used for coupling to the tubing fitting 200 of the exhaust treatment device 110, such as using the band clamp 150 (shown in FIG. 5). In an exemplary embodiment, the tubing fitting 306 includes a fitting body 310 and an annular flange 330 extending from the fitting body 310. In the illustrated embodiment, the fitting body 310 and the annular flange 330 are integral with the housing 302. For example, the annular flange 330 is stamped and formed with the housing 302.

In the illustrated embodiment, the annular flange 330 includes a flare 332 formed at the end of the fitting body 310. The flare 332 is angled outward from the fitting body 310. In the illustrated embodiment, the flare 332 is provided at an obtuse angle (for example, between 90° and 180°) relative to the housing 302. The angle may correspond to the angle of the annular flange 230 of the tubing fitting 200.

In an exemplary embodiment, a gasket 340 is provided between the annular flange 330 in the annular flange 230. The gasket 340 provides a sealed interface between the tubing fitting 200 and the mating tubing fitting 306.

During assembly, the gasket 340 is provided at the forward surface 232 of the annular flange 230 of the tubing fitting 200. The end of the exhaust tube 304 slips over the forward end of the fitting body 210. The forward surface 232 of the fitting body 210 may be received in the exhaust tube 304. The flare 332 of the annular flange 330 faces the gasket 340 and the annular flange 230 of the tubing fitting 200. The band clamp 150 (shown in FIG. 5) is configured be placed around the annular flange is 230, 330 to form a secure joint between the exhaust treatment devices 110, 300. The band clamp 150 is configured to provide compression between the annular flange 230 and the mating annular flange 330 to securely couple the tubing fitting 200 to the mating tubing fitting 306 of the mating exhaust treatment device 300. For example, the band clamp 150 may be radially tightened to compress the annular flange 230 and the mating annular flange 330 together.

Figure 9:
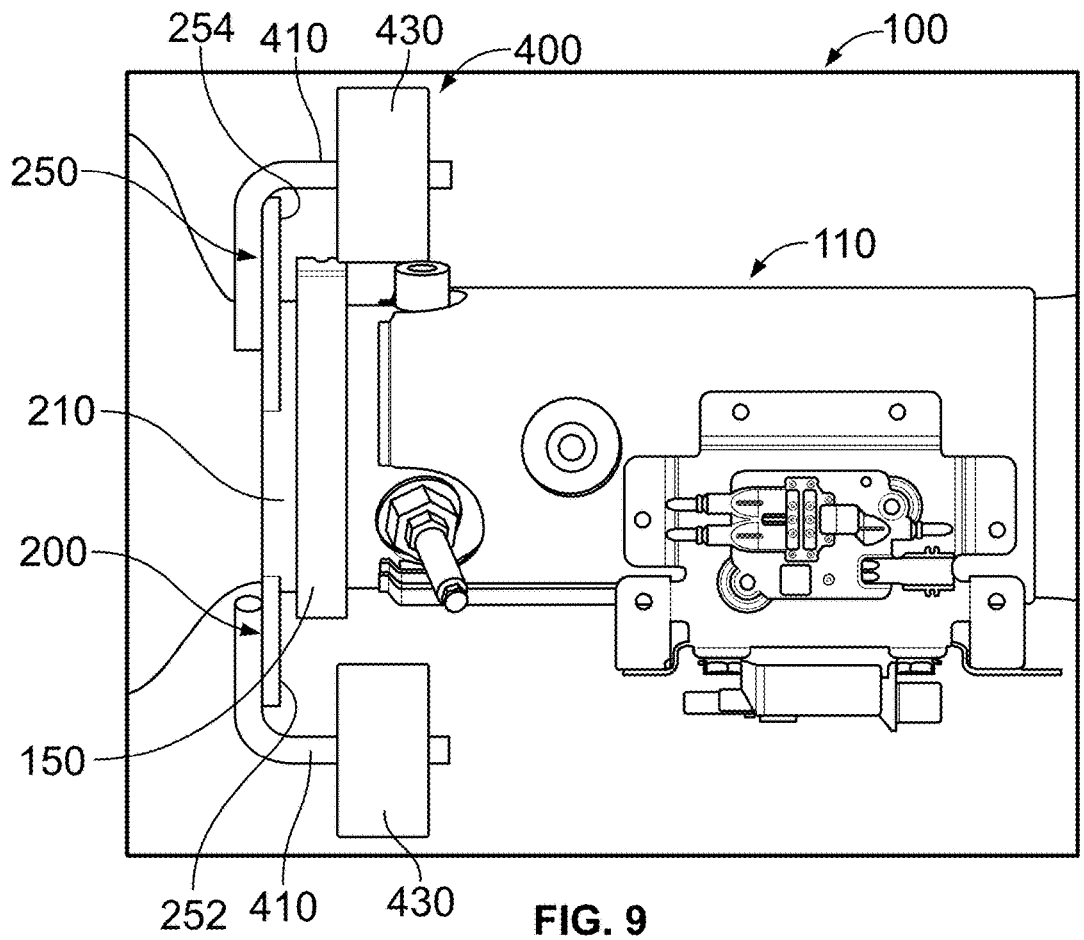
FIG. 9 illustrates a portion of the exhaust aftertreatment system using the tubing fitting and the band clamp to secure the exhaust treatment devices together in accordance with an exemplary embodiment.
Figure 10:
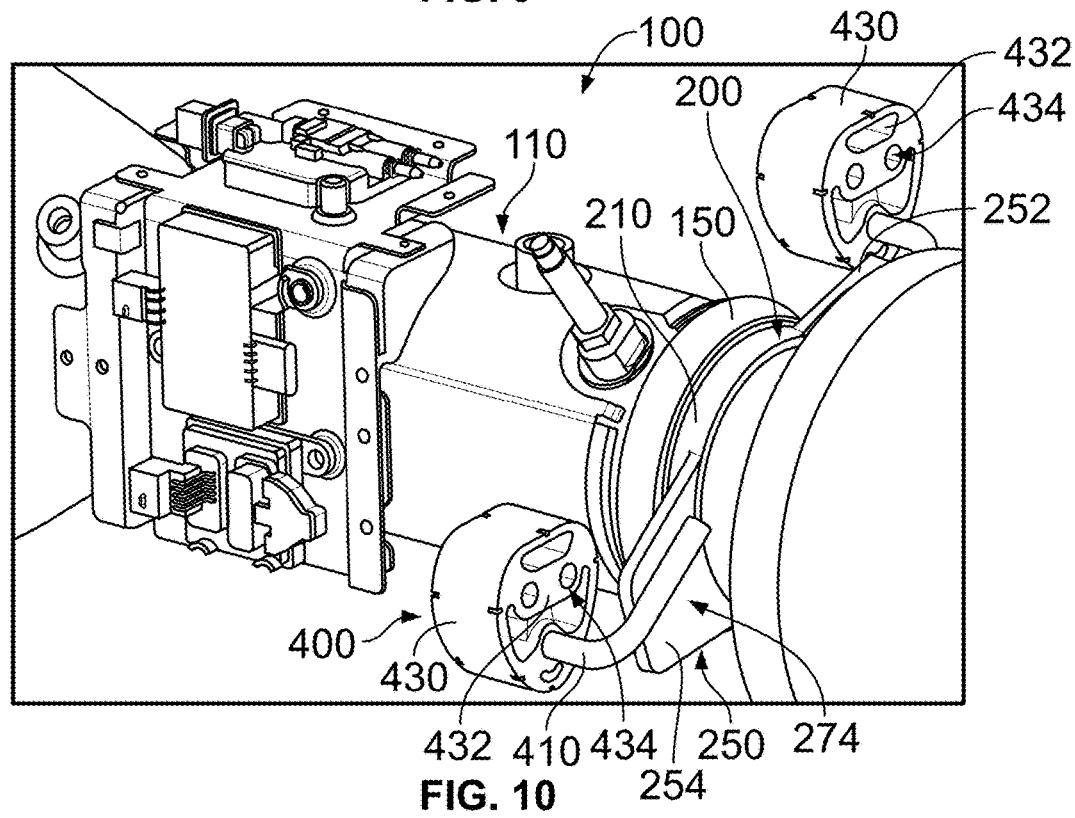
FIG. 10 is a rear perspective view of a portion of the exhaust aftertreatment system in accordance with an exemplary embodiment.
Figure 11:
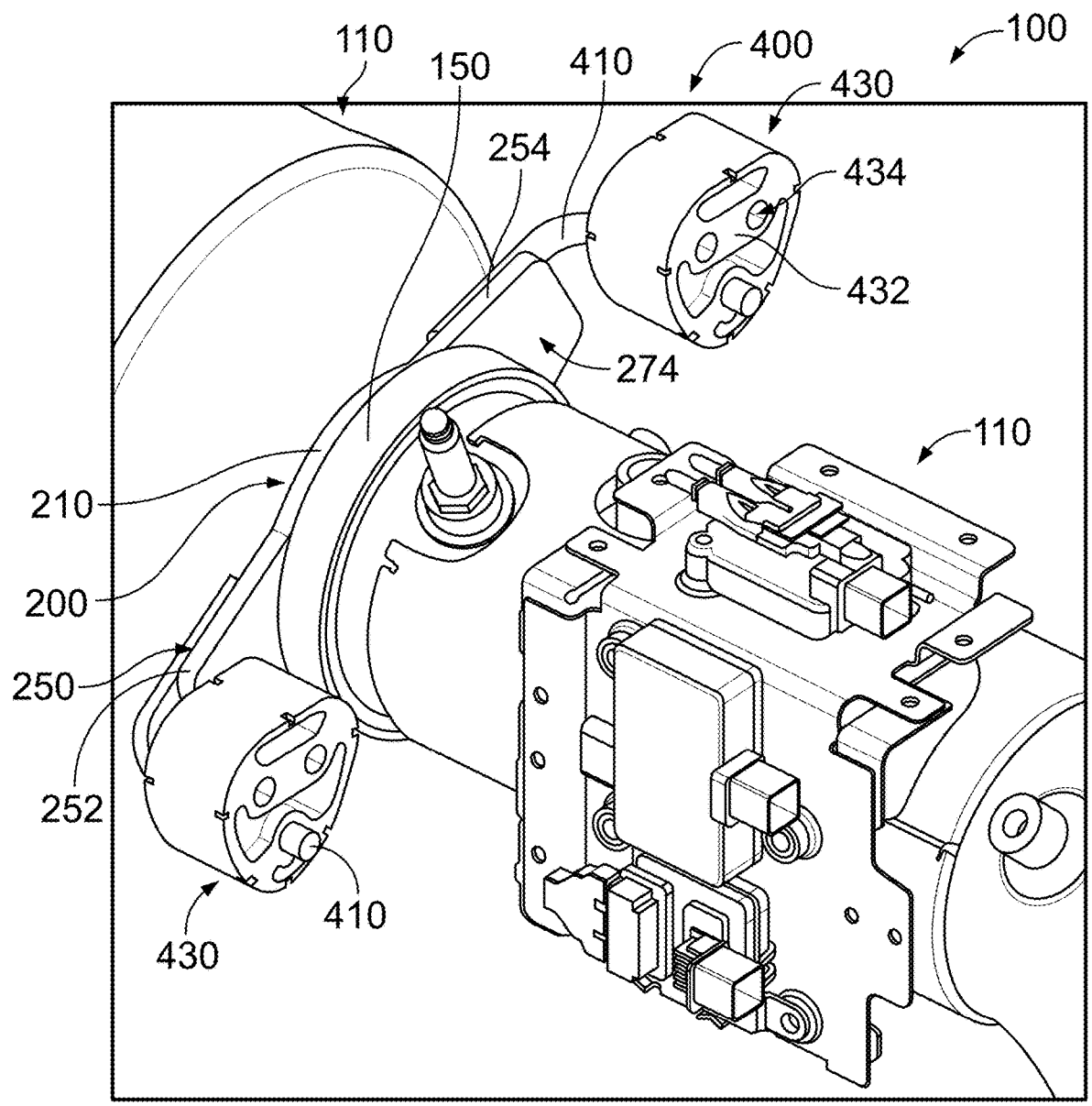
FIG. 11 is a front perspective view of a portion of the exhaust aftertreatment system in accordance with an exemplary embodiment.

FIG. 9 illustrates a portion of the exhaust aftertreatment system 100 using the tubing fitting 200 and the band clamp 150 to secure the exhaust treatment devices 110 together. FIG. 10 is a rear perspective view of a portion of the exhaust aftertreatment system 100 in accordance with an exemplary embodiment. FIG. 11 is a front perspective view of a portion of the exhaust aftertreatment system 100 in accordance with an exemplary embodiment. When assembled, the band clamp 150 is tightened to secure the tubing fittings 200 of the exhaust treatment devices 110 at a secure joint.

In an exemplary embodiment, the exhaust aftertreatment system 100 includes a support assembly 400 used to support the components of the exhaust aftertreatment system 100 relative to the vehicle 10 (FIG. 1). The support assembly 400 is configured to be coupled to the frame 14 (FIG. 1) of the vehicle 10 to support the components of the exhaust aftertreatment system 100. For example, the support assembly 400 may be coupled to the bracket support 15 (FIG. 1) extending from the frame 14. In an exemplary embodiment, the support assembly 400 is coupled directly to the tubing fitting 200. For example, the support assembly 400 is coupled directly to the mounting bracket 250.

In an exemplary embodiment, the support assembly 400 includes support rods 410 configured to be coupled to the bracket tabs 252, 254 of the mounting bracket 250. For example, the support rods 410 may be welded to the weld pads 274 of the bracket tabs 252, 254. The support rods 410 may be metal rods. In the illustrated embodiment, the support rods 410 are cylindrical. However, the support rods 410 may have other cross-sectional shapes in alternative embodiments. The support rods 410 may be bent into a predetermined shape for routing the support rods 410 between the mounting bracket 250 and other components of the support assembly 400. In the illustrated embodiment, the support rods 410 are L-shaped. For example, the support rods 410 include segments with right angle bends between the segments. The support rods 410 may have other shapes in alternative embodiments.

In an exemplary embodiment, the first and second bracket tabs 252, 254 of the mounting bracket 250 are provided at locations around the exterior of the fitting body 210 to accommodate mounting to the support rods 410. For example, the support rods 410 may be provided at both sides (for example, right side and left side) of the exhaust treatment device 110 and the bracket tabs 252, 254 are provided in the locations of the support rods 410. In an exemplary embodiment, the bracket tabs 252, 254 are provided at locations to evenly support the tubing fitting 200. For example, the bracket tabs 252, 254 may be positioned to support both side-to-side motion or vibration of the exhaust treatment device 110 and vertical motion or vibration of the exhaust treatment device 110. In an exemplary embodiment, the bracket tabs 252, 254 are provided at locations selected to allow for clearance of the components of the exhaust aftertreatment system 100 or other systems of the vehicle 10. For example, the bracket tabs 252, 254 may be offset or shifted toward the top or toward the bottom depending on locations of other components, pipes, tubes, electrical wires, or other components of the vehicle 10.

In an exemplary embodiment, the support assembly 400 includes isolators 430 between the mounting bracket 250 and the bracket support 15 of the vehicle 10. The support rods 410 may be coupled to the isolators 430. In an exemplary embodiment, the isolators 430 are flexible to provide dampening four vibrations. For example, the isolators 430 may be manufactured from a rubber material that is flexible to allow the support rods 410 to move relative to the isolators 430. In an exemplary embodiment, the isolators 430 include flexible webs 432 that allow relative movement of portions of the isolators 430. In an exemplary embodiment, the isolators 430 include openings 434 that receive the support rods 410. The flexible webs 432 surround the openings 434 and allow relative movement of the support rods 410.

Figure 12:
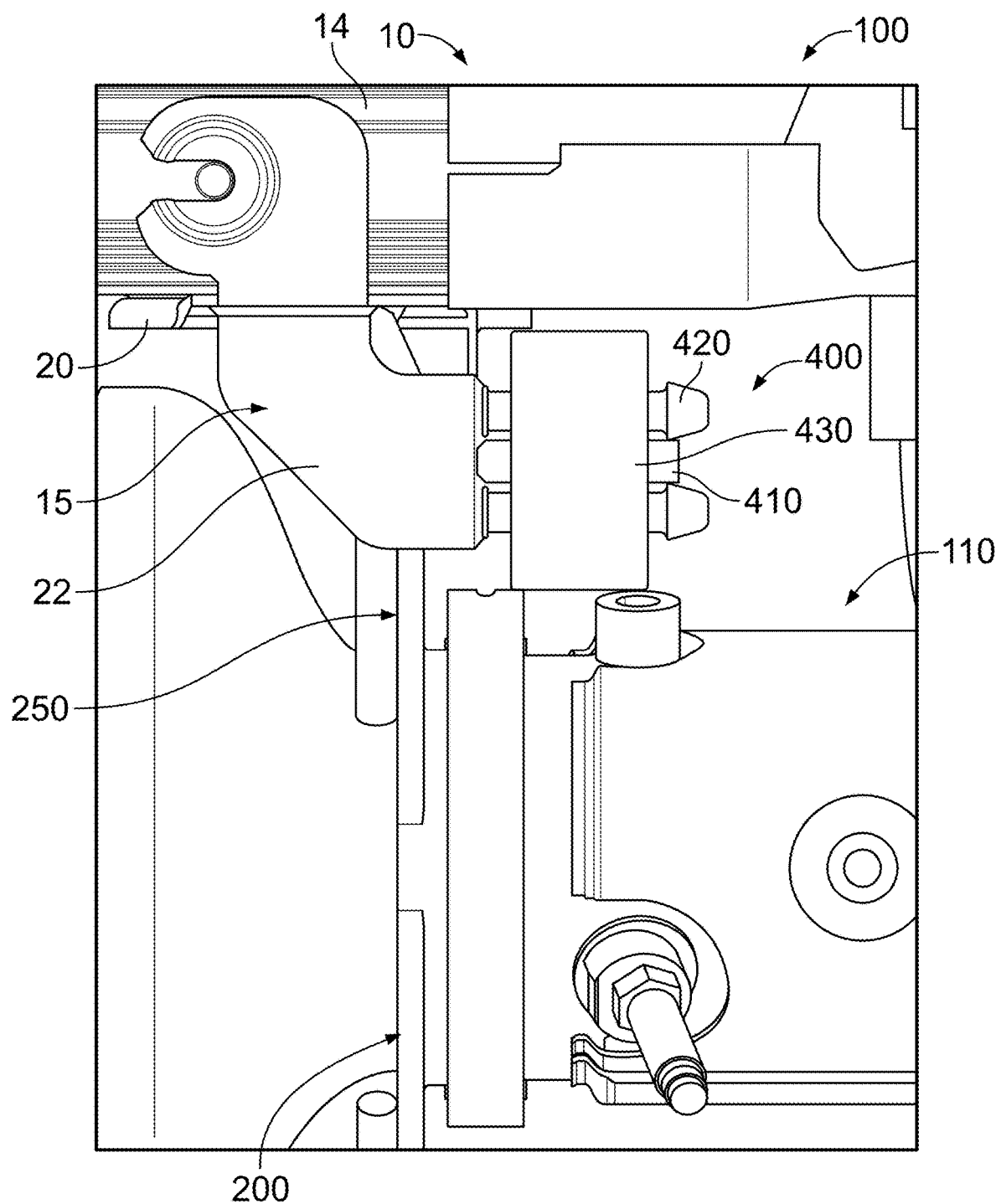
FIG. 12 is a top view of a portion of the exhaust aftertreatment system showing the support assembly securing the tubing fitting of one of the exhaust treatment devices to the bracket support in accordance with an exemplary embodiment.
Figure 13:
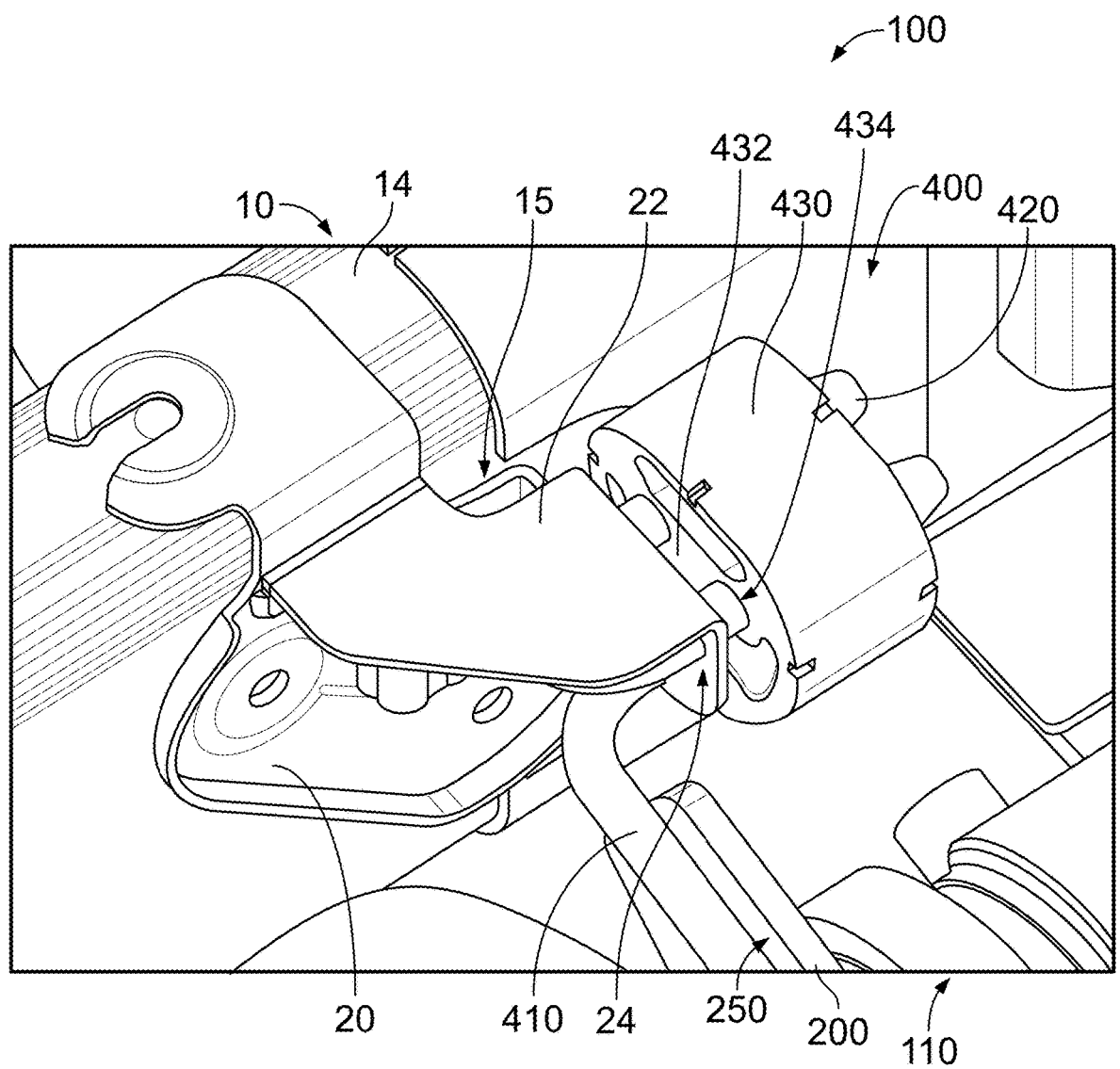
FIG. 13 is a front perspective view of a portion of the exhaust aftertreatment system in accordance with an exemplary embodiment.

FIG. 12 is a top view of a portion of the exhaust aftertreatment system 100 showing the support assembly 400 securing the tubing fitting 200 of one of the exhaust treatment devices 110 to the bracket support 15. FIG. 13 is a front perspective view of a portion of the exhaust aftertreatment system 100 in accordance with an exemplary embodiment. When assembled, the support assembly supports the components of the exhaust aftertreatment system 100 to the frame 14 of the vehicle 10.

The bracket support 15 includes a mounting panel 20 secured to the frame 14 of the vehicle 10, such as using bolts. The bracket support 15 includes support panels 22 extending from the mounting panel 20. The support panel 22 may include openings 24 that receive corresponding support rods.

In an exemplary embodiment, the support rods 410 of the support assembly 400 are component side support rods and may be referred to hereinafter as component side support rods 410. The component side support rods 410 extend between the isolator 430 and the mounting bracket 250 of the tubing fitting 200. The component side support rods 410 support the tubing fitting 200 relative to the isolator 430. The support assembly 400 further includes vehicle side support rods 420. The vehicle side support rods 420 extend between the isolator 430 and the bracket support 15. The vehicle side support rods 420 support the isolator 430 relative to the bracket support 15. The vehicle side support rods 420 may be received in the openings 24 of the support panel 22. In an exemplary embodiment, the vehicle side support rods 420 are configured to be welded to the support panel 22. The vehicle side support rods 420 are received in corresponding openings 434 in the isolator 430. In the illustrated embodiment, multiple vehicle side support rods 420 are provided. However, a single vehicle side support rod 420 may be used in alternative embodiments.

The flexible webs 432 of the isolator 430 are provided between the openings 434. The flexible webs 432 allow relative movement between the vehicle side support rods 420 in the component side support rods 410 to allow relative movement of the components of the exhaust aftertreatment system 100 relative to the frame 14. The isolator 430 dampens vibrations of the components of the exhaust aftertreatment system 100 relative to the frame 14.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112(f), unless and until such claim limitations expressly use the phrase "means for" followed by a statement of function void of further structure.

What is claimed is:

1. An exhaust treatment device for an exhaust aftertreatment system comprising:
    a housing having a chamber for receiving exhaust gas, the housing extending between a first end and a second end, the housing having a first exhaust tube at the first end and a second exhaust tube at the second end;
    a tubing fitting for the first exhaust tube at the first end, the tubing fitting having a fitting body, the tubing fitting including an annular flange at an exterior of the fitting body, the annular flange having a flange interface configured to face a mating flange of a mating tubing fitting, the tubing fitting including a mounting bracket extending from the fitting body configured to be attached to a bracket support; and
    a band clamp configured to be coupled to the annular flange to securely couple the annular flange to the mating flange.

2. The exhaust treatment device of claim 1, wherein the mounting bracket extends from the fitting body remote from the annular flange such that the mounting bracket is spaced apart from the band clamp.

3. The exhaust treatment device of claim 1, wherein the fitting body extends between a front and a rear, the annular flange located proximate to the front, the mounting bracket located proximate to the rear.

4. The exhaust treatment device of claim 1, wherein the mounting bracket includes a first bracket tab and a second bracket tab annually spaced from the first bracket tab.

5. The exhaust treatment device of claim 4, wherein the first and second bracket tabs are located on opposite sides of the fitting body.

6. The exhaust treatment device of claim 4, wherein the first and second bracket tabs are spaced apart by an obtuse angle between 90° and 180°.

7. The exhaust treatment device of claim 1, wherein the tubing fitting is separate and discrete from the first exhaust tube and welded to the first exhaust tube at a weld joint.

8. The exhaust treatment device of claim 1, wherein the mounting bracket includes a weld pad configured to be welded to a support rod extending between the mounting bracket and the bracket support.

9. The exhaust treatment device of claim 1, further comprising a support rod coupled between the mounting bracket and the bracket support.

10. The exhaust treatment device of claim 1, further comprising an insulator, a component side support rod between the insulator and the mounting bracket, and a vehicle side support rod between the insulator and the bracket support.

11. The exhaust treatment device of claim 1, wherein the mounting bracket includes tapered the side walls being wider at the fitting body and narrower at a distal end.

12. The exhaust treatment device of claim 1, wherein the mounting bracket extends from the fitting body at a radiused transition.

13. The exhaust treatment device of claim 1, wherein the annular flange is trapezoidal shaped.

14. The exhaust treatment device of claim 1, further comprising a gasket coupled to the flange interface.

15. The exhaust treatment device of claim 1, wherein the band clamp provides compression between the annular flange and the mating flange to securely couple the tubing fitting to the mating tubing fitting.

16. The exhaust treatment device of claim 1, wherein the band clamp includes an inner groove at an inner surface configured to receive the annular flange and the mating flange, the band clamp being radially tightened to compress the annular flange and the mating flange together in the inner groove.

17. An exhaust aftertreatment system comprising:
    a first exhaust treatment device having a first housing having a first chamber for receiving exhaust gas, the first housing having a first exhaust tube and a first tubing fitting for the first exhaust tube, the first tubing fitting having a first fitting body and a first annular flange at an exterior of the first fitting body, the first annular flange having a first flange interface, the first tubing fitting including a mounting bracket extending from the first fitting body configured to be attached to a bracket support;
    a second exhaust treatment device having a second housing having a second chamber for receiving the exhaust gas, the second housing having a second exhaust tube and a second tubing fitting for the second exhaust tube, the second tubing fitting having a second fitting body and a second annular flange at an exterior of the second fitting body, the second annular flange having a second flange interface configured to face the first flange interface; and
    a band clamp configured to be coupled to the first annular flange and the second annular flange to securely couple the first tubing fitting to the second tubing fitting.

18. The exhaust aftertreatment system of claim 17, wherein the first and second flange interfaces are angled transverse to a mating axis between the first and second treatment devices.

19. The exhaust aftertreatment system of claim 17, wherein the second fitting body of the second tubing fitting is integral with the second exhaust tube.

20. An exhaust aftertreatment system comprising:
    a diesel oxidation catalyst (DOC) device having a DOC housing having a DOC chamber for receiving exhaust gas, the DOC housing having a DOC exhaust tube having a DOC tubing fitting having a DOC fitting body and a DOC annular flange at an exterior of the DOC fitting body, the DOC tubing fitting including a DOC mounting bracket extending from the DOC fitting body configured to be attached to a DOC bracket support;
    a diesel particular filter (DPF) device having a DPF housing having a DPF chamber for receiving exhaust gas, the DPF housing having a DPF exhaust tube having a DPF tubing fitting having a DPF fitting body and a DPF annular flange at an exterior of the DPF fitting body, the DPF tubing fitting including a DPF mounting bracket extending from the DPF fitting body configured to be attached to a DPF bracket support;

a selective catalytic reduction (SCR) device having a SCR housing having a SCR chamber for receiving exhaust gas, the SCR housing having a SCR exhaust tube having a SCR tubing fitting having a SCR fitting body and a SCR annular flange at an exterior of the SCR fitting body, the SCR tubing fitting including a SCR mounting bracket extending from the SCR fitting body configured to be attached to a SCR bracket support; and band clamps configured to be coupled to the DOC annular flange, the DPF annular flange, and the SCR annular flange.

* * * * *